Patented Mar. 1, 1938

2,109,575

UNITED STATES PATENT OFFICE 2,109,575

METHOD OF REMOVING OIL FROM EGGS

Clinton H. Parsons and Leon D. Mink, Chicago, Ill., assignors to Industrial Patents Corporation, Chicago, Ill., a corporation of Delaware No Drawing. Application December 19, 1936, Serial No. 116,735

7 Claims. (Cl. 99—113)

This invention relates to the treatment of oil processed eggs.

Among the methods which have been developed to assist in holding eggs from seasons of heavy production to seasons of scarcity is the method of dipping eggs in heated mineral oil to apply a thin film of oil before the eggs are placed in storage.

Among the eggs which are conventionally treated by oil dipping are the eggs produced on the Pacific Coast. These eggs are white and have thinner shells than eggs produced in some other sections of the country. The thinness and porousness of the shells, coupled with the necessity of shipment long distances, leads to excessive shrinkage. To prevent such shrinkage the shells are covered with a protective covering of oil. Oil dipping develops an unnatural gloss, which is objectionable to the consumer. To remove the unnatural gloss and reestablish the suede finish of an untreated egg, sand blasting has been widely practiced.

The present invention is concerned with a method of removing the gloss quickly and cheaply without detrimental effect to the eggs and without danger of injury to the individuals engaged in handling the eggs.

The present invention involves reacting an acid salt with the calcium carbonate of the egg shell to develop a renewed surface. To permit closer contact of the acid material with the egg shell, a wetting agent is employed.

We have found that the combination of an acid salt which will react with the calcium carbonate of the egg shell and a wetting agent simultaneously applied effectively removes the gloss and produces a surface on an oil processed egg which is more attractive than that which can be secured by sand blasting.

One of the advantages of the present method is that the dangers of contamination and breakage incident to sand blasting and other methods which have been practiced is obviated.

The present invention may be carried out by submerging the oil processed eggs in a solution of mono sodium phosphate and sodium lauryl sulfate for a period of two to three minutes. An effective solution may be prepared by the addition of five per cent to ten per cent mono sodium phosphate and 0.1 per cent to 0.25 per cent sodium lauryl sulfate to water. Mono sodium phosphate is an acid salt and reacts mildly with the calcium carbonate of the egg shell. Sodium lauryl sulfate is a wetting agent and permits closer contact of the acid with the shell. It will be understood that any substance which will react with the egg shell to renew the surface may be effectively employed in carrying out the present invention. It will also be understood that any suitable acid substance may be employed, and that any suitable wetting agent may be used to facilitate the intimacy of contact of the acid material with the egg shell.

We claim:

1. The method of removing the gloss from eggs which comprises submerging the eggs in a solution including an acid material and a wetting agent.

2. The method of removing gloss from eggs which comprises treating the surface of the eggs with an acid material and a wetting agent.

3. The method of removing gloss from eggs which comprises submerging the eggs in a solution of mono sodium phosphate and sodium lauryl sulfate.

4. The method of removing gloss from eggs which comprises submerging the eggs in a solution of mono sodium phosphate and sodium lauryl sulfate for a period of two to three minutes.

5. The method of removing gloss from eggs which comprises submerging the eggs in a five to ten per cent solution of mono sodium phosphate, and from 0.1 per cent to 0.25 per cent sodium lauryl sulfate.

6. The method of removing gloss from eggs which comprises submerging the eggs in a five to ten per cent solution of mono sodium phosphate, and from 0.1 per cent to 0.25 per cent sodium lauryl sulfate for a period of two to three minutes.

7. The method of renewing the surfaces of eggs which comprises treating said surfaces with a solution including an acid material and a wetting agent.

CLINTON H. PARSONS.
LEON D. MINK.